(12) United States Patent
Ishizuka

(10) Patent No.: US 7,823,084 B2
(45) Date of Patent: Oct. 26, 2010

(54) INFORMATION PROCESSING DEVICE AND METHOD, AND INFORMATION PROCESSING PROGRAM

(75) Inventor: Kensaku Ishizuka, Tokyo (JP)

(73) Assignee: Sony Corporation, Tokyo (JP)

( * ) Notice: Subject to any disclaimer, the term of this patent is extended or adjusted under 35 U.S.C. 154(b) by 547 days.

(21) Appl. No.: 10/148,827

(22) PCT Filed: Oct. 5, 2001

(86) PCT No.: PCT/JP01/08820

§ 371 (c)(1),
(2), (4) Date: Sep. 26, 2002

(87) PCT Pub. No.: WO02/32124

PCT Pub. Date: Apr. 18, 2002

(65) Prior Publication Data

US 2003/0078994 A1   Apr. 24, 2003

(30) Foreign Application Priority Data

Oct. 6, 2000   (JP) .............................. 2000-308298

(51) Int. Cl.
*G06F 3/00* (2006.01)
*G06F 3/048* (2006.01)
(52) U.S. Cl. .................. 715/838; 715/830; 715/853; 715/854
(58) Field of Classification Search .............. 715/830, 715/838
See application file for complete search history.

(56) References Cited

U.S. PATENT DOCUMENTS

| | | | | |
|---|---|---|---|---|
| 5,724,532 A | * | 3/1998 | Thomson | 719/329 |
| 5,864,868 A | * | 1/1999 | Contois | 707/104.1 |
| 5,977,971 A | * | 11/1999 | Guzak et al. | 715/853 |
| 6,067,086 A | * | 5/2000 | Walsh | 715/808 |
| 6,138,150 A | * | 10/2000 | Nichols et al. | 709/219 |
| 6,148,377 A | * | 11/2000 | Carter et al. | 711/147 |
| 6,175,863 B1 | * | 1/2001 | Belfiore et al. | 709/218 |
| 6,226,672 B1 | * | 5/2001 | DeMartin et al. | 709/219 |
| 6,237,010 B1 | * | 5/2001 | Hui et al. | 715/502 |
| 6,248,946 B1 | * | 6/2001 | Dwek | 84/609 |
| 6,335,742 B1 | * | 1/2002 | Takemoto | 715/781 |

(Continued)

FOREIGN PATENT DOCUMENTS

JP   8-279982   10/1996

(Continued)

*Primary Examiner*—Ryan F Pitaro
(74) *Attorney, Agent, or Firm*—Oblon, Spivak, McClelland, Maier & Neustadt, L.L.P.

(57) ABSTRACT

A note-type personal computer according to the present invention has an LCD for displaying information stored in an internal storage provided therein, and an external storage or an external picture server connected thereto, via the internet. And, operation for the information stored in the respective storages is performed by the user in the same procedure using operation units such as a keyboard, a touch pad, with indication on the LCD confirmed. When the information stored in the picture server is displayed, the LCD displays auxiliary information indicative of this notice. The LCD displays the auxiliary information using a different folder name, or displays the auxiliary information on the background of a display area of the LCD. So, the user can confirm contents on the internet easily without the need of performing complicated operations.

5 Claims, 8 Drawing Sheets

U.S. PATENT DOCUMENTS

| | | | | |
|---|---|---|---|---|
| 6,380,957 | B1 * | 4/2002 | Banning | 715/828 |
| 6,381,029 | B1 * | 4/2002 | Tipirneni | 358/1.14 |
| 6,407,752 | B1 * | 6/2002 | Harnett | 715/744 |
| 6,448,985 | B1 * | 9/2002 | McNally | 715/784 |
| 6,570,593 | B1 * | 5/2003 | Bowers et al. | 715/775 |
| 6,583,799 | B1 * | 6/2003 | Manolis et al. | 715/838 |
| 6,633,850 | B1 * | 10/2003 | Gabbard et al. | 705/14 |
| 6,636,250 | B1 * | 10/2003 | Gasser | 715/853 |
| 6,697,090 | B1 * | 2/2004 | Nagasaka et al. | 715/769 |
| 6,735,623 | B1 * | 5/2004 | Prust | 709/219 |
| 6,876,759 | B2 * | 4/2005 | Keller et al. | 382/128 |
| 7,099,490 | B1 * | 8/2006 | Fujita et al. | 382/100 |
| 7,107,516 | B1 * | 9/2006 | Anderson et al. | 715/210 |
| 7,409,644 | B2 * | 8/2008 | Moore et al. | 715/774 |
| 2001/0000541 | A1 * | 4/2001 | Schreiber et al. | 713/100 |
| 2002/0097278 | A1 * | 7/2002 | Mandler et al. | 345/854 |
| 2003/0033402 | A1 * | 2/2003 | Battat et al. | 709/224 |
| 2004/0179115 | A1 * | 9/2004 | Tomat et al. | 348/231.6 |
| 2004/0193594 | A1 * | 9/2004 | Moore et al. | 707/4 |
| 2004/0220899 | A1 * | 11/2004 | Barney et al. | 707/1 |

FOREIGN PATENT DOCUMENTS

| | | |
|---|---|---|
| JP | 08-279982 | 10/1996 |
| JP | 9-312791 | 12/1997 |
| JP | 10-290419 | 10/1998 |
| JP | 11-261865 | 9/1999 |
| JP | 11-297044 | 10/1999 |
| JP | 2000-083191 | 3/2000 |

* cited by examiner

INFORMATION PROCESSING DEVICE AND METHOD, AND INFORMATION PROCESSING PROGRAM

TECHNICAL FIELD

The present invention relates to an information processing apparatus which can have an access to an internal storage provided therein and an external storage connected thereto, an information processing method for displaying information stored in the internal storage and the external storage and processing the information, and an information processing program based on the information processing method.

BACKGROUND ART

Conventionally, when acquiring contents on the network, it is necessary to go through several steps of connecting a client computer to the network, searching for a desired place including the contents on the internet, downloading the contents, and confirming the contents, which steps require complicated operations.

DISCLOSURE OF THE INVENTION

Accordingly, the present invention has an object to overcome the above-mentioned drawbacks of the prior art by providing an information processing apparatus and method, and an information processing program, which enable the user to confirm the contents on the internet easily without the need of performing complicated operations.

The above object can be attained by providing an information processing apparatus which can have an access to an internal storage provided therein and to an external storage connected thereto, including operation means, and display means for displaying information stored in the internal storage and the external storage, wherein operation for the information stored in the respective storages is performed in the same procedure using the operation means with indication on the display means confirmed.

Also, the above object can be attained by providing an information processing method for displaying information stored in an internal storage provided in an information processing apparatus and in an external storage connected to the apparatus on display means, and processing the information using operation means including connection step of making a communication connection to the external storage, selection step of selecting the information stored in the external storage, whose communication connection with the information processing apparatus is secured by way of the connection step, on displaying the information on the display means and using the operation means, similar to the operation for displaying the information stored in the internal storage, and information acquisition step of acquiring information selected from the external storage in the selection step.

Also, the above object can be attained by providing an information processing program for displaying information stored in an internal storage provided in an information processing apparatus and in an external storage connected to the apparatus on display means, and processing the information using operation means including connection step of making a communication connection to the external storage, selection step of selecting the information stored in the external storage, whose communication connection with the information processing apparatus is secured by way of the connection step, on displaying the information on the display means and using the operation means, similar to the operation for displaying the information stored in the internal storage, and information acquisition step of acquiring information selected from the external storage in the selection step.

BEST MODE FOR CARRYING OUT THE INVENTION

The present invention will further be described below concerning the best modes with reference to the accompanying drawings.

Figure 1:
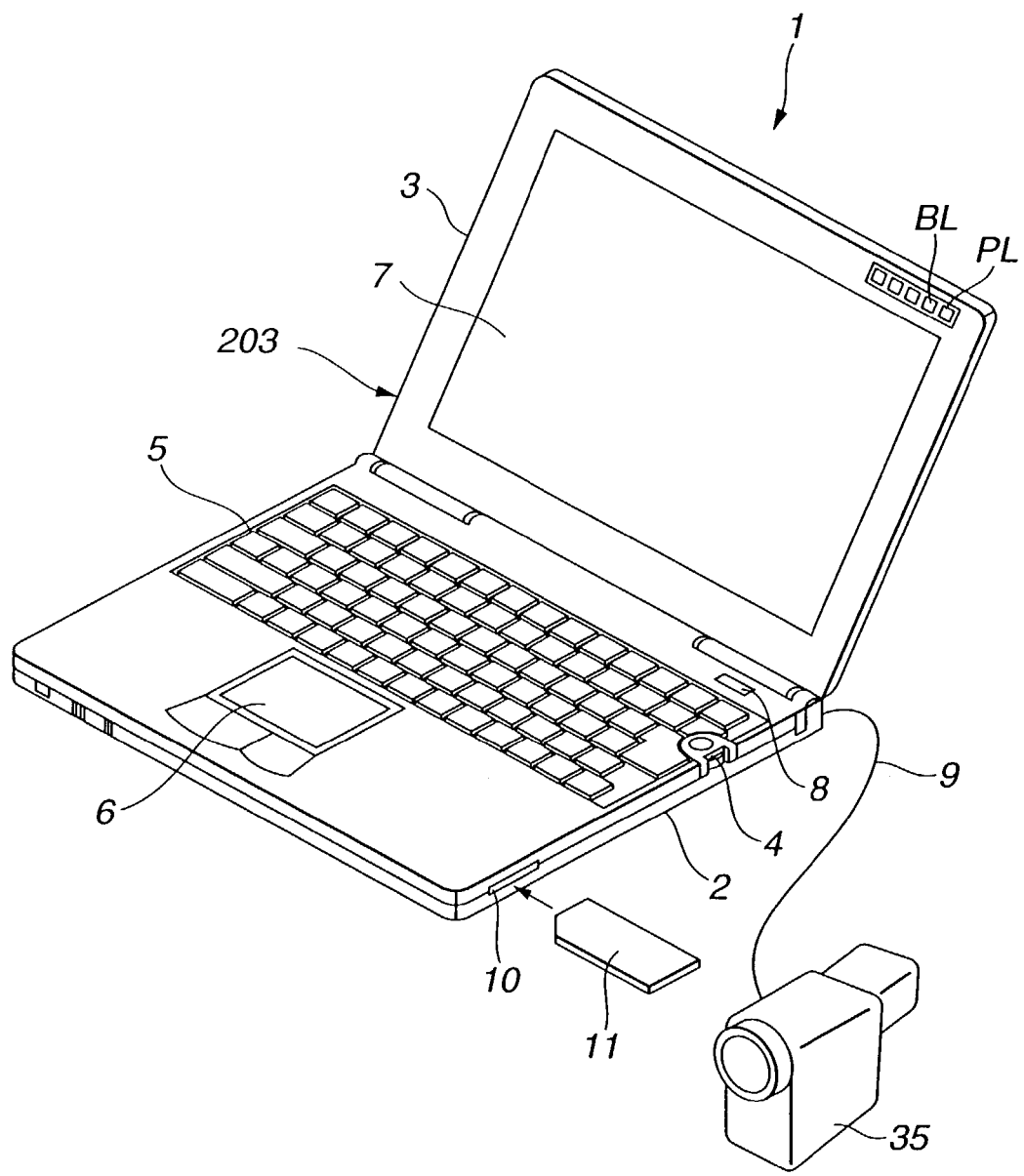
FIG. 1 shows a perspective view of a note-type personal computer employing the present invention.

FIG. 1 shows a perspective view of a note-type personal computer 1 employing the present invention, and a digital video camera 35 which is connected to the note-type personal computer 1 via an IEEE 1394 cable 9 conforming to the IEEE 1394 format.

The note-type personal computer 1 basically includes a main body 2, and a display unit 3 which can be folded to and unfolded from the main body 2. The note-type personal computer 1 shown in FIG. 1 has the display unit 3 unfolded from the main body 2.

The main body 2 has a jog dial 4, a keyboard 5 for inputting characters, symbols, numbers, etc., a touch pad 6 used as a pointing device for moving a mouse cursor displayed on a display screen etc., and a power switch 8, which are arranged on the top surface of the main body 2. On the other hand, a mouse, not shown, is often used as a pointing device, which could be connected to the main body 2. The mouse, similar to the touch pad 6, is adopted for operating a mouse cursor etc. Also, a mouse wheel, not shown, is often used as a pointing device, which could be connected to the main body 2.

The display unit 3 has an LCD (Liquid Crystal Display) 7 for displaying pictures on the front surface thereof. Furthermore, the display unit 3 has a power lamp PL, a battery lamp BL, a message lamp ML if necessary, and other lamps, which are LEDs, on the right upward portion thereof.

The jog dial 4 is arranged on the right upward portion of the keyboard 5 such that the lateral portion thereof protrudes from the right side of the main body 2. Also, the main body 2 is provided with a PC card slot, a memory card slot, etc. on the right side thereof. The memory card slot has a semiconductor memory such as a flush memory built therein, and has a memory card such as a memory stick (registered trade mark) which stores still picture data, moving picture data, speech data, text data, programs, etc. installed thereto.

The note-type personal computer 1 has an IEEE 1394 terminal arranged on the rear side of the main body 2, and the digital video camera 35 is connected to the IEEE 1394 terminal via the IEEE 1394 cable 9. The note-type personal computer 1 can take in or receive video data from the digital video camera 35 as moving picture data and still picture data by executing application software for taking in video data of moving picture data and still picture data. The note-type personal computer 1 can take in video data which has been already shot, and can also take in that of camera-through directly.

Furthermore, the note-type personal computer 1 can take in still picture data which is shot by a digital still camera or a digital video camera using a memory stick.

The note-type personal computer 1 concentratively manages moving picture data and still picture data stored in various removable media or storages such as a hard disc, floppy disk, MO, PC card, and other card-shaped memories by executing application software for picture viewer & picture reformation processing.

Also, the note-type personal computer 1 concentratively manages moving picture data and still picture data stored in a storage of a picture server etc. which is connected via the network by executing application software for picture viewer & picture reformation processing.

Specifically, the note-type personal computer 1 reads out the application software for picture viewer & picture reformation processing from a program storage media such as a CD-ROM, HDD into a RAM, and causes the application software to be executed by a central processing unit (CPU).

Figure 2:
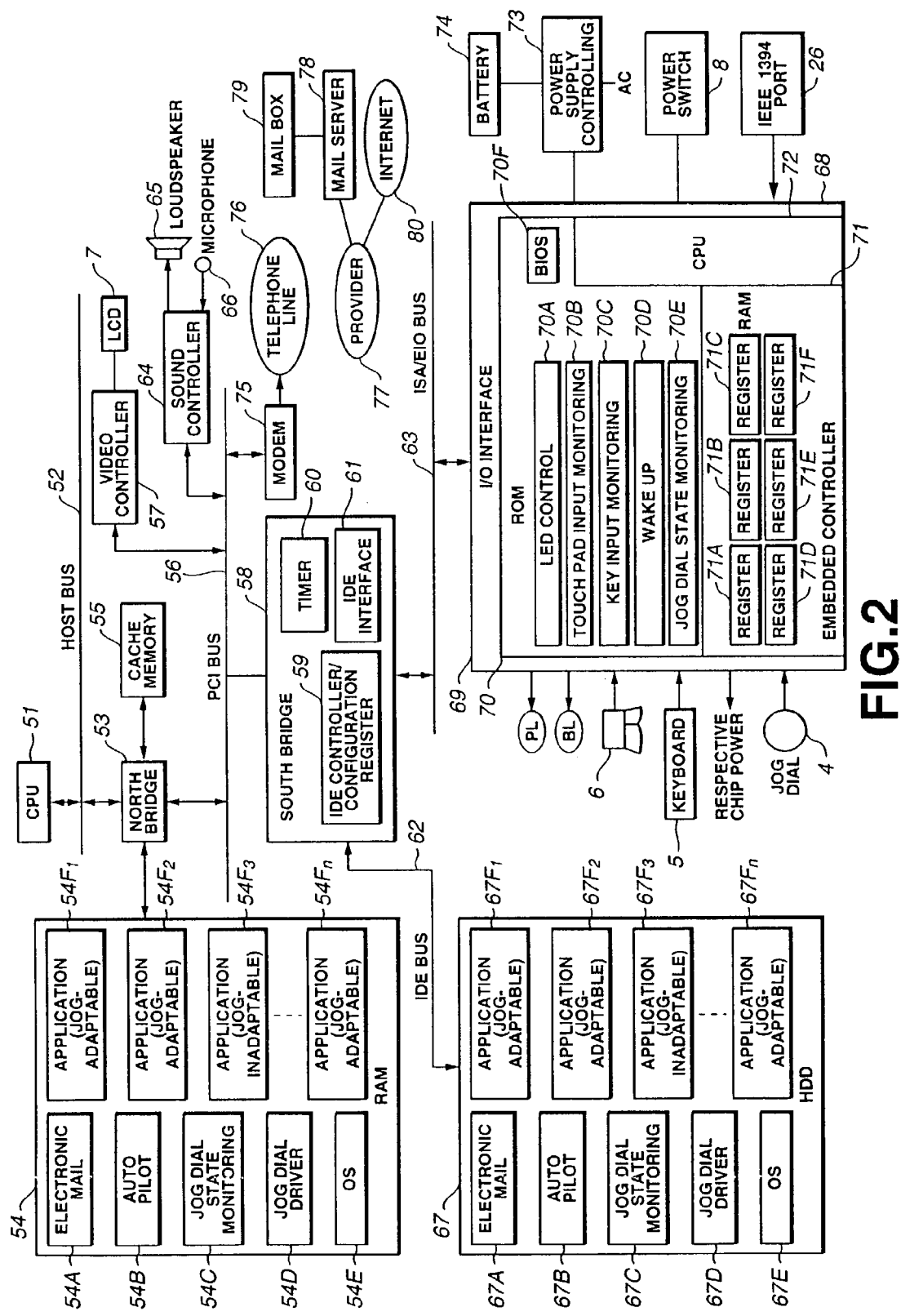
FIG. 2 shows a block diagram of the note-type personal computer.

At first, the electrical configuration of the note-type personal computer 1 will be explained with reference to FIG. 2. A CPU 51 such as a Pentium (registered trade mark) processor manufactured by Intel Corporation is connected to a host bus 52. A north bridge 53 is connected to the host bus 52, and the north bridge 53 is connected also to a PCI bus 56. The north bridge 53 such as a 400BX manufactured by Intel Corporation controls the CPU 51 and the periphery of a main memory 54. The north bridge 53 and a south bridge 58, to be described later, jointly form a chip set.

The north bridge 53 is connected also to the main memory 54 and a cache memory 55. The cache memory 55 caches data to be used by the CPU 51. The CPU 51 also has a primary cache memory, not shown, built therein.

The main memory 54 such as a DRAM (Dynamic Read Only Memory) stores programs to be executed by the CPU 51 and data necessary for operating the CPU 51. Specifically, when the initiation (boot up) of the main memory 54 is completed, an HDD 67 transfers an electronic mail program 54A, an auto pilot program 54B, a jog dial state monitoring program 54C, a jog dial driver 54D, an operating program (OS) 54E, other application programs $54F_1$~$54F_n$, etc. to the main memory 54, and the main memory 54 receives and stores these programs. The application program $54F_1$ is the application software for picture viewer & picture reformation processing, hereinafter.

The electronic mail program 54A is a program for sending and receiving communication messages from a communication line such as a telephone line 76 via a modem 75, to be described later, by means of the internet. The electronic mail program 54A has the function of delivered mail acquisition. Under the delivered mail acquisition function, the user inquires of a mail server 78 owned by an internet service provider 77 whether a mail box 79 has received mails directed to the user, and acquires mails in case there are such mails.

The auto pilot program 54B sequentially initiates preset plural items of precessing (or plural programs) in a preset order, and executes the processing or programs.

The OS (basic program software) 54E such as Windows 95 and 98 (both registered trade mark) manufactured by Microsoft Corporation, Mac OS (registered trade mark) manufactured by Apple Computer Inc. etc. controls basic operation of a computer.

The jog dial state monitoring program 54C receives information of jog dial adaptability from the respective applications, and in case the application is jog-dial-adaptable, the jog dial state monitoring program 54C displays what can be performed on operating the jog dial 4. Normally, the jog dial state monitoring program 54C is in the state of waiting for the event of the jog dial 4, and has a list of information to be received from the applications. The jog dial driver 54D performs various functions corresponding to the operation of the jog dial 4.

As the application software for picture viewer & picture reformation processing referred to as the application program $54F_1$, Picture Gear (registered trade mark) can be exemplified, specifically. The Picture Gear is software which can concentratively manages moving picture data and still picture data stored in various removable media such as a hard disc, floppy disk, MO, PC card, and other card-shaped memories. Respective pictures can be displayed in a list by a predetermined operation, which enables the user to visually find out a subject picture. By performing picture reformation processing, a panoramic picture of 360 degrees and a label having a photo can be formed. Furthermore, an HTML album whose pictures can be seen by means of a WWW browser can also be formed. The details will be described later.

A video controller 57 is connected to the PCI bus 56, and controls the displaying operation of the LCD 7 arranged on the display unit 3 based on data supplied via the PCI bus 56.

A sound controller 64 is connected to the PCI bus 56, which receives audio signals from a microphone 66 and send audio signals to a speaker 65. A modem 75 is also connected to the PCI bus 56. The modem 75 can be connected to a communication network such as the internet 80 and the mail server 78 via the telephone line 76 and internet service provider 77.

The south bridge 58 is also connected to the PCI bus 56. The south bridge 58 such as a PIIX4E manufactured by Intel Corporation controls various I/O (Input/Output). That is, the south bridge 58 is composed of an IDE (Integrated Drive Electronics) controller/configuration register 59, a timer circuit 60, and an IDE interface 61, which controls devices connected to an IDE bus 62, devices connected to an ISA/EIO (Industry Standard Architecture/Extended Input Output) bus 63, and devices connected to an embedded controller 68.

The IDE controller/configuration register 59 is composed of two IDE controllers or a primary IDE controller and a secondary IDE controller, a configuration register, etc. not shown.

The primary IDE controller is connected to a connecter, not shown, via the IDE bus 62, and the HDD 67 is connected to the connecter. Also, the secondary IDE controller is connected to bay devices as IDE devices such as a CD-ROM drive, a second HDD, an FDD, not shown, via another IDE bus, etc. When such bay devices are connected to the secondary IDE controller, connecters of the bay devices are electrically connected to the secondary IDE controller.

The HDD 67 stores an electronic mail program 67A, an auto pilot program 67B, a jog dial state monitoring program 67C, a jog dial driver 67D, an OS (basic program software) 67E, other application programs $67F_1$~$67F_n$, etc. in advance. The application program $67F_1$ is the application software for picture viewer & picture reformation processing such as the Picture Gear. Thus, the HDD 67 is a specific example of a program storage medium according to the present invention.

The respective programs 67A, 67B, 67C, 67D, 67E, 67F$_1$~67F$_n$ in the HDD 67 are sequentially transferred to the main memory 54 in the initiation (boot up) processing, and the programs are temporarily stored in the main memory 54 as the electronic mail program 54A, an auto pilot program 54B, a jog dial state monitoring program 54C, a jog dial driver 54D, an operating program (OS) 54E, other application programs 54F$_1$~54F$_n$, etc.

The embedded controller 68 is also connected to the ISA/EIO bus 63. The embedded controller 68 is a micro controller, and is used as an I/O controller. That is, an I/O interface 69, a ROM 70, a RAM 71, a CPU 72 are mutually connected to each other to configure the embedded controller 68.

An LED control program 70A, a touch pad input monitoring program 70B, a key input monitoring program 70C, a wake up program 70D, a jog dial state monitoring program 70E are stored in the ROM 70.

The LED control program 70A is a program for controlling the lighting of the power lamp PL, battery lamp BL, message lamp ML if necessary, and other lamps, which are LEDs. The touch pad input monitoring program 70B is a program for monitoring input operation by the user from the touch pad 6. The key input monitoring program 70C is a program for monitoring input operation by the user from the keyboard 5 and other key switches. The wake up program 70D is a program for checking the current time data supplied from the timer circuit 60 in the south bridge 58 with the preset time, and managing respective chip power supplies so as to initiate predetermined processing (or programs) when the current time corresponds with the preset time.

The jog dial state monitoring program 70E is a program for monitoring the state of the jog dial 4, and checks if the jog dial 4 is rotated or pressed.

The ROM 70 stores a BIOS (Basic Input/Output System) 70F. The BIOS is a basic input/output system, and is a software program for controlling data receiving/sending (input/output) among the OS, application software, peripheral devices (display, keyboard, HDD, etc.)

A RAM 71 has registers 71A~71F for LED controlling, touch pad input status, key input status, time setting up, jog dial state monitoring, etc. For example, an LED controlling register 71A controls the lighting of the message lamp ML, to be described later, for indicating the instant rising state of an electronic mail after the jog dial 4 is pressed. A key input status register 71C stores an operation key flag when the jog dial 4 is pressed for one-touch operation, to be described later. A time setting up register 71D can set up the time arbitrarily.

Furthermore, the jog dial 4, touch pad 6, keyboard 5 are connected to the embedded controller 68 via connecters, not shown. The embedded controller 68 sends signals corresponding to the respective operations of the jog dial 4, touch pad 6, keyboard 5 to the ISA/EIO bus 63. Also, the power lamp PL, battery lamp BL, message lamp ML, and other lamps, which are LEDs, are connected to the embedded controller 68.

Furthermore, a power supply controlling circuit 73 is connected to the embedded controller 68. The power supply controlling circuit 73 is connected to a built-in battery 74 or an AC power supply, which supplies necessary power to respective units, and controls charging of the built-in battery 74 and second batteries of peripheral devices. Also, the embedded controller 68 monitors a power switch 8 which is operated when the power is turned on or off.

Furthermore, an IEEE 1394 port 26 is connected to the embedded controller 68. So, the note-type personal computer 1 can receive video data from the digital video camera 35 via the IEEE 1394 cable 9 which is connected to the IEEE 1394 port 26.

Next, the configuration of a picture viewer & picture reformation processing system which consists of the note-type personal computer 1, internet 80, and a picture server 100 will be explained with reference to FIG. 3.

One example of the picture server 100 is a server for use in Image Station (trade mark) which was established as an image sharing service.

The Image Station is a new network service using moving pictures and still pictures. The user can preserve moving pictures and still pictures in an album by having an access to the site of the Image Station to perform member registration, and uploading the moving picture data and still picture data of the user from his personal computer. The user can see thus preserved pictures, and can send the picture data from his personal computer. Also, the user can make the album public, and can upload the picture data to an album which is owned jointly by users having the same hobby or taste. Thus, the network service can be used for communication among such users.

Conventionally, when uploading picture data to the internet, the user is required to have the knowledge of processing concerning the Web site construction and the network construction. On the other hand, when the Image Station employs the information processing apparatus and method according to the present invention, the user can upload picture data on desktop of his personal computer by relocating the picture into an icon for drag-and-drop in the site of the Image Station. Furthermore, downloading can be performed by simple processing.

On the other hand, what is connected to the note-type personal computer 1 is not limited to the picture server 100, and an HDD of large capacity or another storage such as a recording medium can be connected to the note-type personal computer 1.

The note-type personal computer 1 has the LCD 7 for displaying information stored in an internal storage provided therein, and an external storage or the external picture server 100 connected thereto, via the internet 80. And, operation for the information stored in the respective storages is performed by the user in the same procedure using operation units such as the keyboard 5, touch pad 6, with indication on the LCD 7 confirmed.

When the information stored in the picture server 100 is displayed, the LCD 7 displays auxiliary information indicative of this notice. The LCD 7 displays the auxiliary information using a different folder name, or displays the auxiliary information on the background of a display area of the LCD 7.

Figure 3:
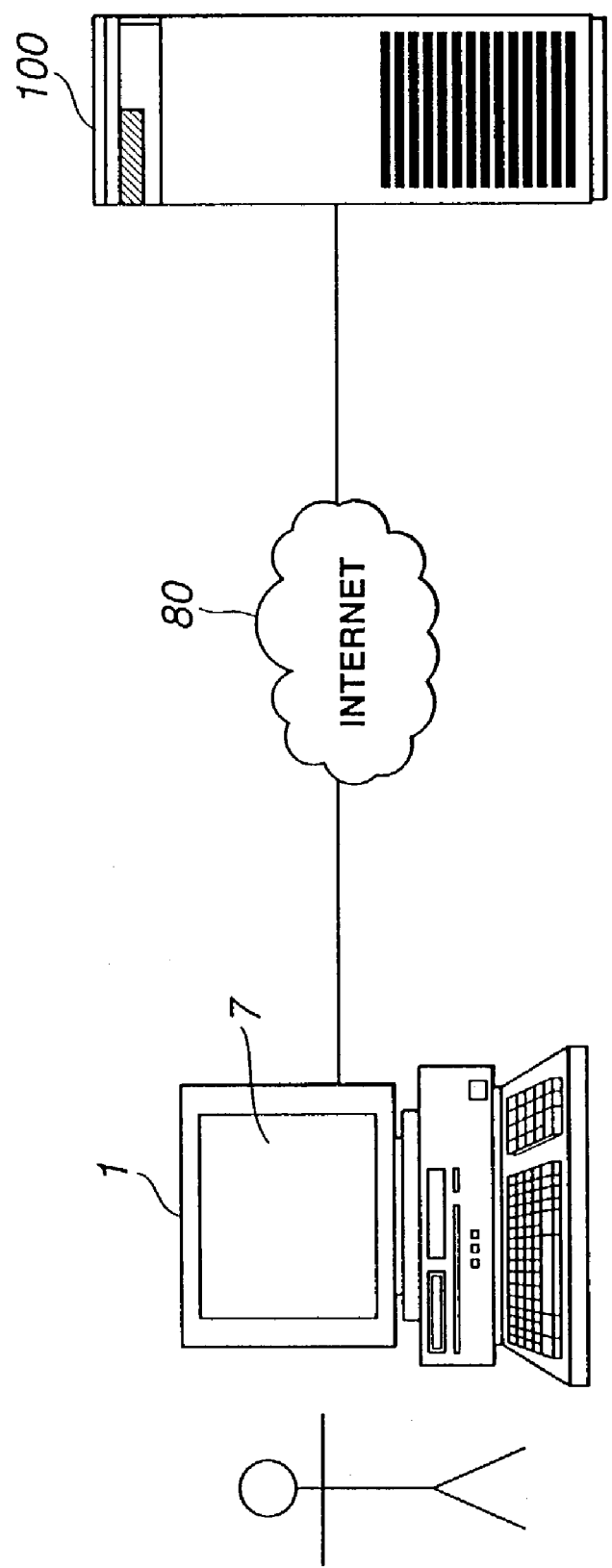
FIG. 3 shows an information processing system which consists of the note-type personal computer, internet, and a picture server.
Figure 4:
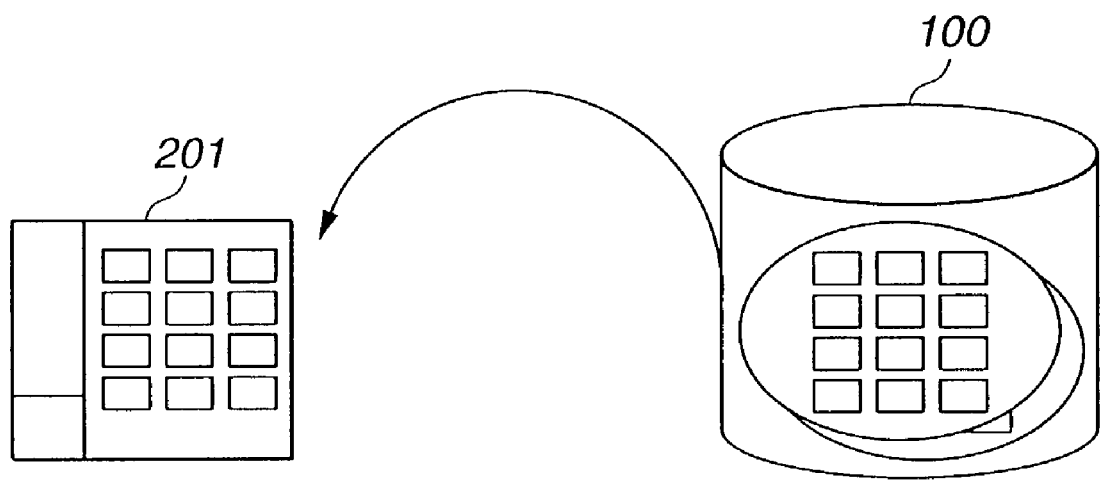
FIG. 4 shows the state in which a Picture Gear window displayed on a LCD of the note-type personal computer displays information concerning contents sent from the picture server.

In the picture viewer & picture reformation processing system shown in FIG. 3, a Picture Gear window 201 displayed on the LCD 7 of the note-type personal computer 1 (local computer) displays information concerning the contents stored in the internal storage of the note-type personal computer 1, and other information concerning the contents sent from the picture server 100, as shown in FIG. 4. In this way, the picture viewer & picture reformation processing system can display multimedia contents via the internet such as picture information in a simplified manner without troubling or burdening the user, similar to the operation for displaying picture information stored in the internal storage.

Figure 5:
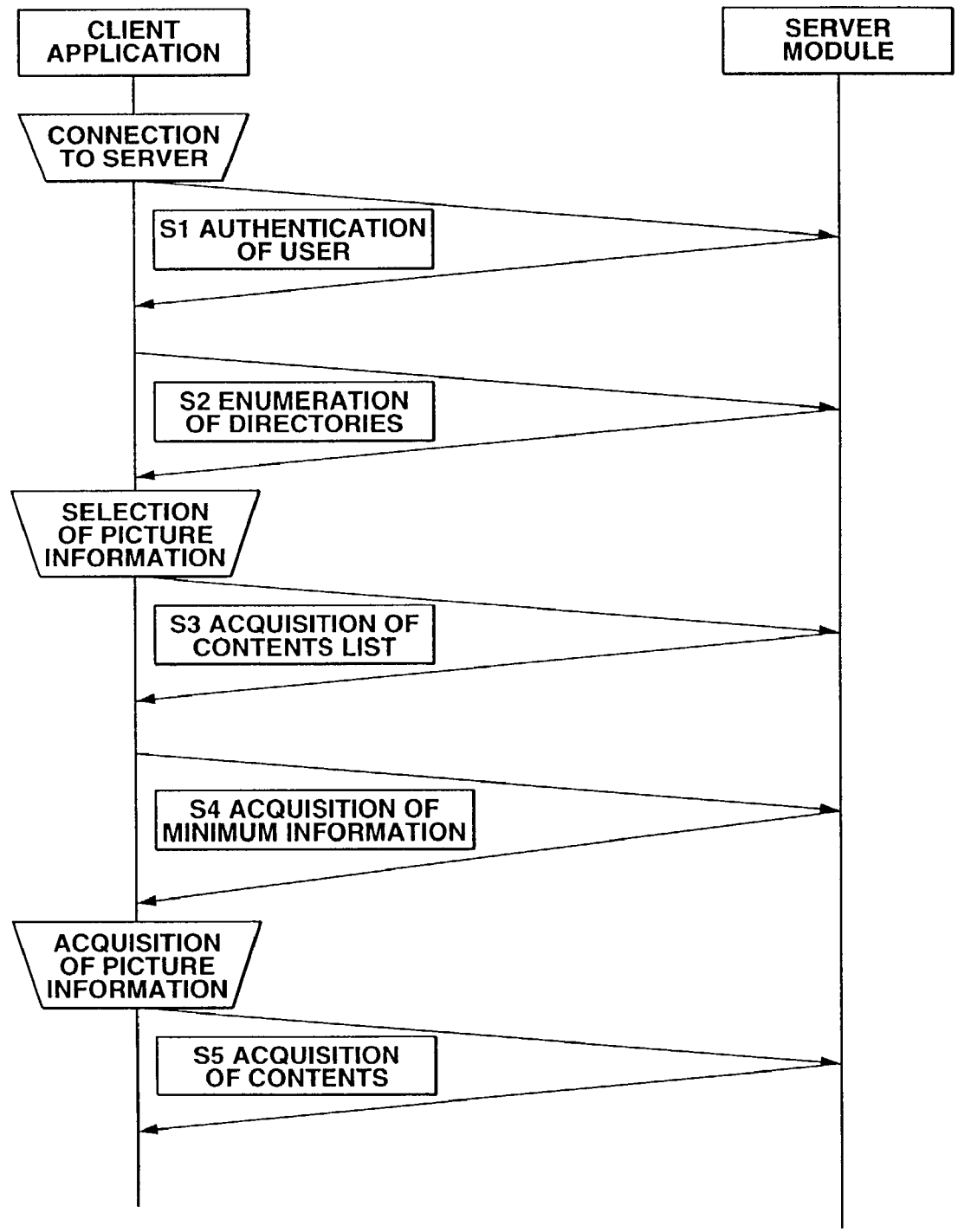
FIG. 5 shows a flow chart of an operation for acquiring contents on a network of the information processing system.

Next, an operation for acquiring contents on a network of an information processing system such as the picture viewer & picture reformation processing system will be explained with reference to FIG. 5. In FIG. 5, the application software for picture viewer & picture reformation processing is shown as client application software, while the picture server 100 is shown as server module.

The client application software includes connection step of making a communication connection to the picture server 100 connected to the note-type personal computer 1 via the internet 80, selection step of selecting picture information stored in the picture server 100, whose communication connection with the note-type personal computer 1 is secured by way of the connection step, by displaying the information on the LCD 7 and using the operation units, similar to the operation for displaying the picture information stored in the internal storage, and information acquisition step of acquiring picture information selected from the picture server 100 in the selection step.

Specific example of the connection step is authentication processing of the user in step S1, which step is to be described later. Specific examples of the selection step are processing for enumerating directories in step S2, processing for acquiring contents in step S3, and processing for acquiring minimum information in step S4, which steps are to be described later. Specific example of the information acquisition step is processing for acquiring contents in step S5.

First, in step S1, the note-type personal computer 1 performs authentication processing of the user by executing the client application software. In the following explanation, it is considered that the client application software is executed by the note-type personal computer 1. The authentication processing of the user is performed when the user sends account, password, etc. After the authentication processing is completed, the server module sends a message that the server module has authenticated the user to the client application software.

Next, the client application software executed by the note-type personal computer 1 requires the server module to send a directory list, or list of directories, thereto so as to find a place (referred to as directory, hereinafter) where contents peculiar to the user or contents owned jointly by a specific group. Responding to the request, the server module sends a directory list to the client application software. Then, in step S2, the client application software displays the directory list and enumerates directories to the user, and makes the user select a directory whose contents the user wants to confirm. At this time, the client application software concurrently displays a directory list concerning the contents stored in the internal storage on a presentation area 202 for presenting directories, to be described later.

Figure 6:
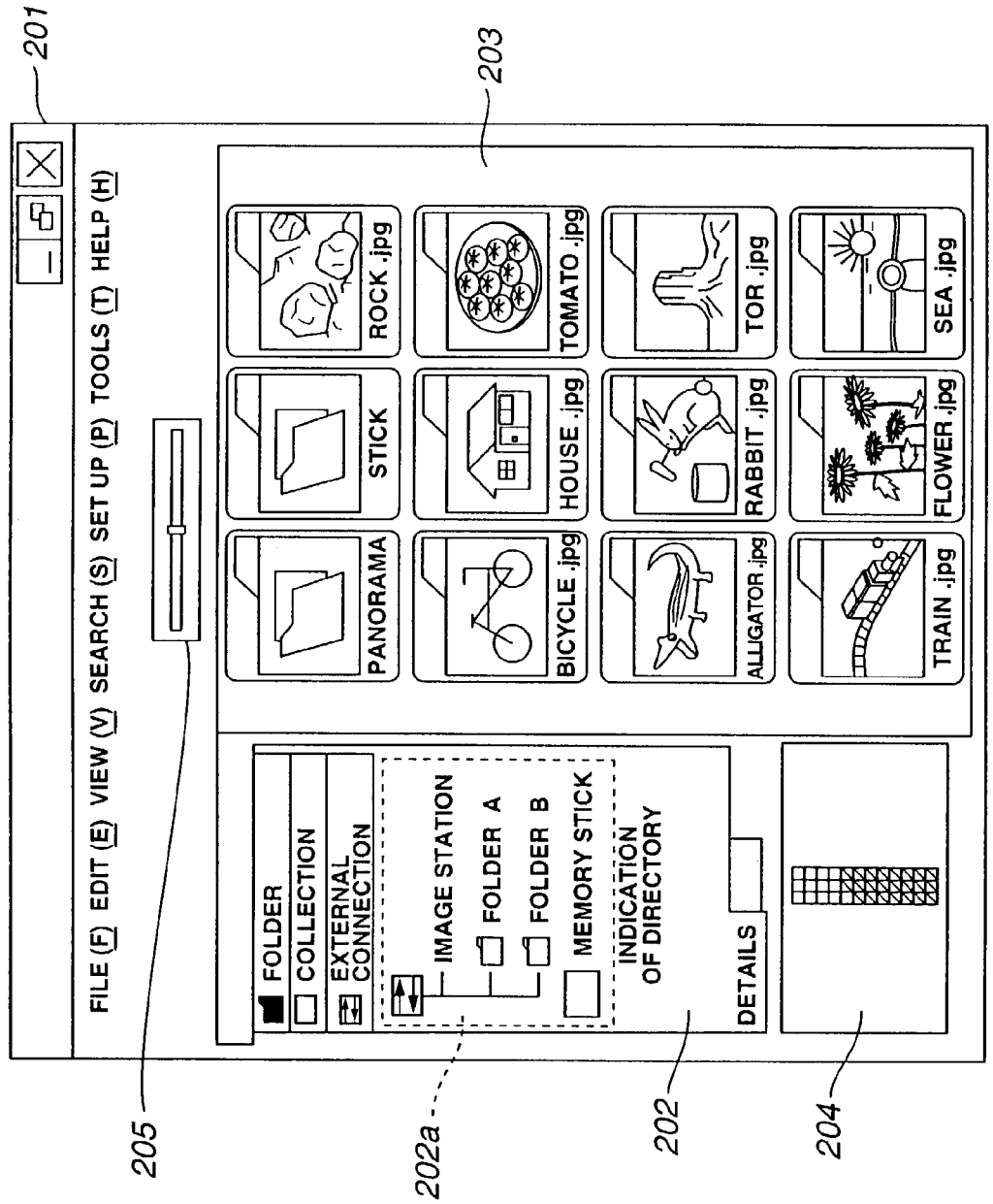
FIG. 6 shows a specific example of directories, from which the user selects one directory, and confirms the contents thereof.

FIG. 6 shows a specific example of directories, from which the user selects one directory, and confirms the contents thereof. The Picture Gear window 201 is composed of the presentation area 202 for presenting directories, a picture display area 203, and another picture display area 204, in which pictures are displayed with their sizes highly reduced. The picture display area 203 displays many zoomed pictures of arbitrary size in the form of a list (sheet view displaying). When displaying all the pictures, picture display area 204 with high reduction degree can be used. Only one picture selected from the sheet-view-displayed pictures can be displayed on the picture display area 203. Sizes of pictures in the picture display area 203 and the picture display area 204 can be expanded/reduced by a slide operation unit 205 with a gage for zoom in/out operation. A picture, or pictures which are sheet-view-displayed in the form of a list can be zoomed in/out with high speed in the range, for example, from 12.5% to 800%.

In the presentation area 202, so as to definitely distinguish a folder in the internal storage of the note-type personal computer 1 from that in the external storage or server module connected to the note-type personal computer 1 via the internet, the internal folder is shown simply as "folder", while the external folder is shown as "external connection". In FIG. 6, contents in the internal "folder" are displayed on the picture display area 203. In case of selecting the "external connection", the user is required to select desired folder (folder A or folder B) from a detailed presentation area 202a for the external folders.

When the folder B is selected, the client application software requires the server module to send a contents list, or list of contents, thereto, which exists in the directory of the folder B. When the server module sends a contents list responding to the request, in step S3, the client application software can acquire the contents list.

Then, in step S4, the client application software requires the server module to send part of all the respective contents acquired in the step S3 thereto so as to acquire minimum information of the contents. Responding to the request, the server module sends part of the respective contents. The minimum information is thumbnails of pictures or one frame of moving pictures.

Figure 7:
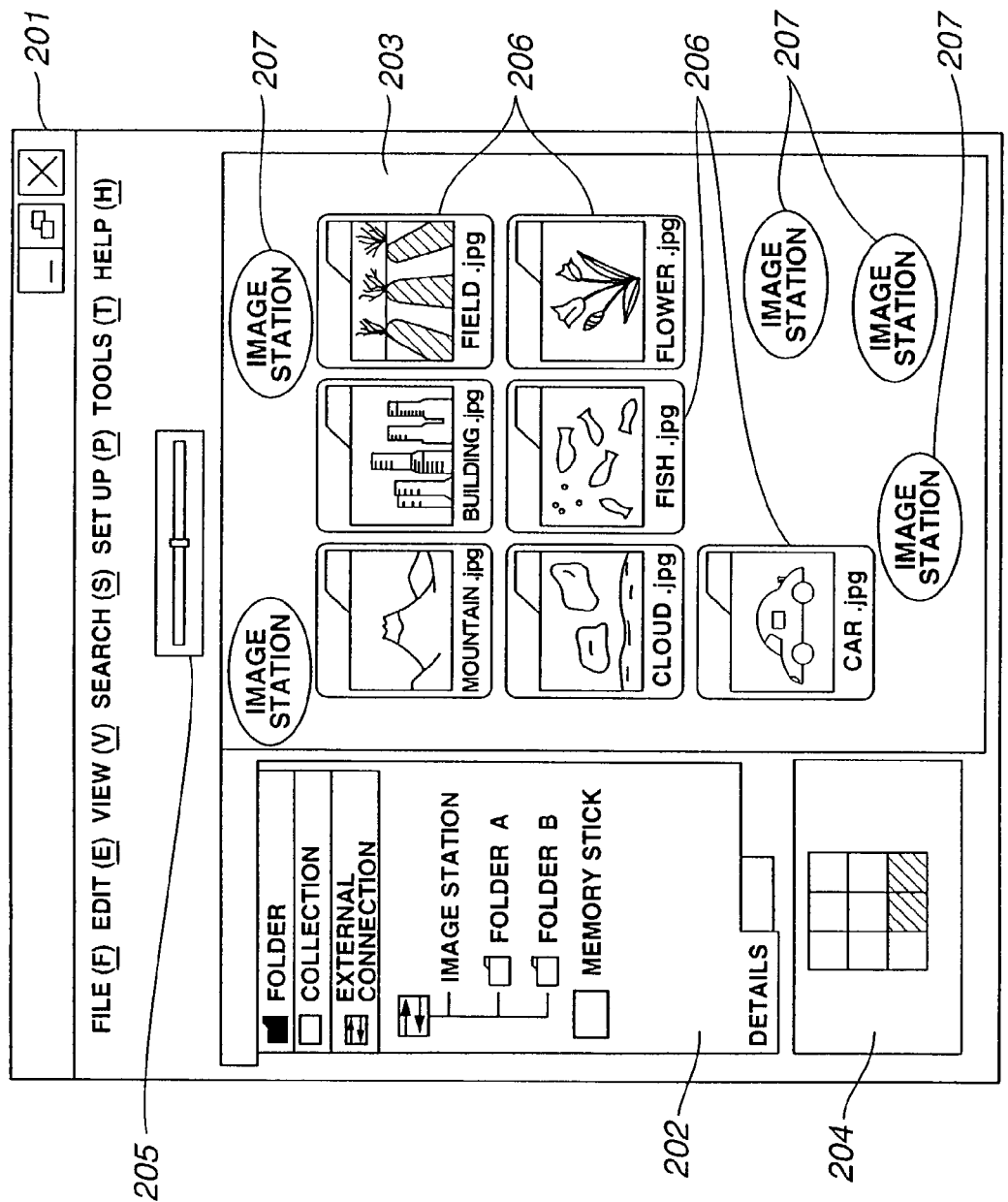
FIG. 7 shows thumbnail pictures displayed on a picture display area by a client application software.

FIG. 7 shows thumbnail pictures 206 displayed on the picture display area 203 by the client application software. By taking a look at the thumbnail pictures 206, the user can grasp the contents before acquiring the contents, which enables the user to obtain the standard for judgement to select necessary data. This processing is performed actively by the application software without the user's operation. Thus, the user can grasp the contents by only selecting a directory in which the contents exist. At this time, the picture display area 203 displays auxiliary information 207 indicative of the Image Station on the background of the thumbnail pictures 206. This intends to distinguish the displaying manner for pictures of the internal storage from that for pictures of the Image Station, which displaying manners are similar to each other.

When the client application software acquires the minimum contents information in step S4 and displays the thumbnail pictures 206 on the picture display area 203, and the user decides to acquire picture data after taking a look at the thumbnail pictures 206, then in step S5, the application software requests the server module to send contents of the picture data thereto corresponding to the operation of the user. Then, the client application software acquires all the contents in case the contents are sent from the server module. This operation is similar to that for acquiring contents stored in the internal storage of the local computer. This operation means copying files, displaying pictures, etc.

Next, an operation for sending contents to the network of the information processing system will be explained with reference to FIG. 8. As shown, there are performed authentication processing of the user in step S11, processing for enumerating directories in step S12, processing for acquiring contents in step S13, and processing for acquiring minimum information in step S14, which processing steps are similar to those of step S1 to step S4 shown in FIG. 5.

Then in step S15, the client application software transfers contents stored in the local computer (note-type personal computer 1) of the user to the server module. This operation is similar to that for processing contents stored in the internal storage of the local computer. That is, specifically, pasting files, drag-and-drop operation, etc. In more detail, the user opens local folders stored in the internal storage on the presentation area 202 of a directory in the Picture Gear window 201 shown in FIG. 6, and displays contents pictures on the picture display area 203. Then, the user select desired picture from the contents pictures, and performs drag-and-drop operation for the selected picture to relocate the picture into a folder of the Image Station presented on the presentation area 202.

According to the note-type personal computer 1 incorporated into the picture viewer & picture reformation processing system, contents which actually do not exist in the personal computer can be presented to the user as if the contents exist in his personal computer. Thus, the user can deal with contents on the network in a manner similar to that for dealing with contents in a local computer which the user is accustomed to using. So, user interface (UI) can be unified, which can reduce operations that the user have to learn.

Figure 8:
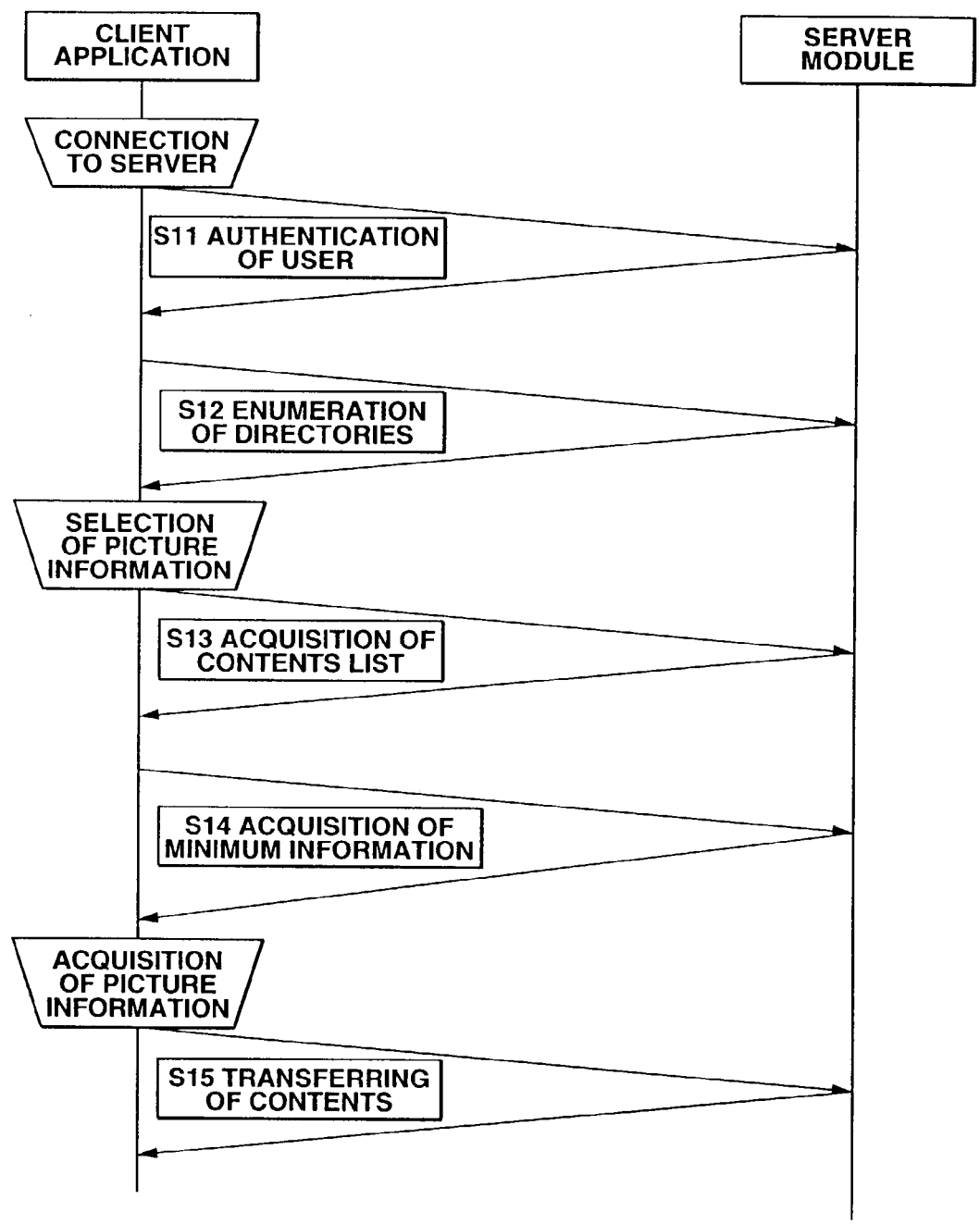
FIG. 8 shows a flow chart of an operation for sending contents to the network of the information processing system.

The note-type personal computer 1 reads out the application software for picture viewer & picture reformation processing shown in FIG. 5 and FIG. 8 from a program storage media such as an HDD, and causes the application software to be executed by a CPU. When a picture viewer & picture reformation processing apparatus is configured by using only hardware, the apparatus becomes complicated and enlarged in size. So, the configuration of the hardware of the note-type personal computer 1 can be simplified.

As in the above, the picture viewer & picture reformation processing system processes picture information such as moving pictures and still pictures. On the other hand, as the information, music information and text information is possible.

For example, when processing music information, in step S4 shown in FIG. 5, title names and artist names of the music information may be displayed, or intro of a few seconds may be played.

INDUSTRIAL APPLICABILITY

As in the above, the information processing apparatus and method, and information processing program according to the present invention enable the user to confirm the contents on the internet easily without the need of performing complicated operations.

The invention claimed is:

1. An information processing apparatus, comprising:
   an internal storage unit having internal contents stored therein, said internal storage unit having an input/output interface;
   an external input/output interface unit configured to connect to an external storage unit separated from said information processing apparatus by a public network, said external storage unit having external contents stored therein;
   a retrieving unit configured to retrieve said internal contents and said external contents; and
   a display unit having a directory display area and a contents display area in a single window, configured to display (i) in the directory display area, both internal directory information for said internal contents and external directory information for said external contents and (ii) in the contents display area, either internal contents information or external contents information as a list form in accordance with user selection of said internal or external directory information in said directory display area, wherein
   said both internal directory information and external directory information continues to be displayed while said list form is displayed in said contents display area,
   said external contents information is a minimal amount of information regarding each external content, and
   wherein said external contents information is displayed in said contents display area, at least one graphic information is displayed around said external contents information and within said contents display area, and the graphic information notifies the user that they are currently viewing external contents information.

2. The apparatus according to claim 1, wherein said minimal amount of information regarding the each external content contains a thumbnail picture when at least one of said external contents is a picture.

3. The apparatus according to claim 1, the display unit configured to further display (iii) an operating icon near the contents display area, wherein visual size of the internal or external contents information can be decreased or increased by moving the icon.

4. The apparatus according to claim 1, the display unit configured to further display (iii) in an additional contents display area near the contents display area, either internal contents information or external contents information as a list form in accordance with user selection of said internal or external directory information in said directory display area, wherein
   the additional contents display area is placed near the contents display area, and
   visual size of the internal or external contents information in the additional contents display area can be highly reduced compared with that in the contents display area.

5. An information processing apparatus, comprising:
   internal storage means for storing internal contents therein, said internal storage means having an input/output interface;
   external input/output interface means for connecting to an external means for storing separated from said information processing apparatus by a public network, said external storage means having external contents stored therein;
   means for retrieving said internal contents and said external contents; and
   means for displaying having a directory display area and a contents display area in a single window, which displays (i) in the directory display area, both internal directory information for said internal contents and external directory information for said external contents and (ii) in the contents display area, either internal contents information or external contents information as a list form in accordance with user selection of said internal or external directory information in said directory display area, wherein
   said both internal directory information and external directory information continues to be displayed while said list form is displayed in said contents display area,
   said external contents information is a minimal amount of information regarding each external content, and
   wherein said external contents information is displayed in said contents display area, at least one graphic information is displayed around said external contents information and within said contents display area, and the graphic information notifies the user that they are currently viewing external contents information.

\* \* \* \* \*